(12) United States Patent
Leung et al.

(10) Patent No.: US 7,908,454 B2
(45) Date of Patent: Mar. 15, 2011

(54) APPLICATION-SPECIFIC HEAP MANAGEMENT

(75) Inventors: Yiu-Ming Leung, Kirkland, WA (US); Jiannan Zheng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/768,419

(22) Filed: Jun. 26, 2007

(65) Prior Publication Data

US 2009/0006502 A1    Jan. 1, 2009

(51) Int. Cl.
  G06F 12/00    (2006.01)
  G06F 13/00    (2006.01)
  G06F 13/28    (2006.01)

(52) U.S. Cl. ........ 711/170; 711/147; 711/171; 711/173; 711/E12.006; 711/E12.009

(58) Field of Classification Search .................. 711/147, 711/170, 171, 173
  See application file for complete search history.

(56) References Cited

U.S. PATENT DOCUMENTS

| | | | | |
|---|---|---|---|---|
| 5,978,893 | A * | 11/1999 | Bakshi et al. | 711/171 |
| 6,401,182 | B1 * | 6/2002 | Sweeney | 711/171 |
| 6,490,670 | B1 * | 12/2002 | Collins et al. | 711/173 |
| 2003/0084265 | A1 * | 5/2003 | Heller et al. | 711/170 |
| 2003/0084266 | A1 * | 5/2003 | Knippel et al. | 711/173 |
| 2003/0200409 | A1 * | 10/2003 | Sayag | 711/170 |
| 2004/0133759 | A1 * | 7/2004 | Sekiguchi | 711/170 |
| 2004/0250041 | A1 * | 12/2004 | Sollich | 711/170 |
| 2004/0268076 | A1 * | 12/2004 | Chauvel et al. | 711/170 |
| 2006/0064687 | A1 * | 3/2006 | Dostert | 718/1 |
| 2006/0277368 | A1 * | 12/2006 | Lewis | 711/140 |

* cited by examiner

Primary Examiner — Matt Kim
Assistant Examiner — Michael Alsip
(74) Attorney, Agent, or Firm — Lee & Hayes, PLLC

(57) ABSTRACT

Tools and techniques for application-specific heap management are described herein. The tools may provide machine-readable storage media containing machine-readable instructions for profiling an application to facilitate managing heap memory associated with the application, and for managing requests from the application to allocate or deallocate from the heap memory based on the profiling. The tools may also receive requests from the application to allocate buffers, and may determine whether an instance-level memory pool, which is associated with a portion of the application, contains enough free buffers to satisfy the request. Finally, the tools may receive requests from the application to deallocate buffers, and in response to the request, may deallocate the requested buffers into the instance-level memory pool. The tools may also determine whether the instance-level memory pool contains a number of free buffers that exceeds a threshold.

8 Claims, 6 Drawing Sheets

APPLICATION-SPECIFIC HEAP MANAGEMENT

BACKGROUND

Applications may allocate memory dynamically from heap memory pools during execution. More specifically, different threads of a given application may allocate and deallocate portions of heap memory, termed "buffers" herein, as they proceed through execution. Typically, one or more applications, or threads of applications, share the heap, with the various different applications or threads allocating and freeing buffers of different sizes. Additionally, these applications or threads may allocate and free the buffers at different rates.

As many different threads allocate and deallocate buffers from the common heap, the heap may become fragmented, thereby reducing the overall amount of heap memory that is available for allocation to various requesters. Eventually, this fragmentation may lead to reduced application performance, and if allowed to proceed to an extreme, the heap may be exhausted and applications may fail.

SUMMARY

Tools and techniques for application-specific heap management are described herein. The tools may provide machine-readable storage media containing machine-readable instructions for profiling an application to facilitate managing heap memory associated with the application, and for managing requests from the application to allocate or deallocate from the heap memory based on the profiling. The tools may also receive requests from the application to allocate buffers, and may determine whether an instance-level memory pool, which is associated with a portion of the application, contains enough free buffers to satisfy the request. Finally, the tools may receive requests from the application to deallocate buffers, and in response to the request, may deallocate the requested buffers into the instance-level memory pool. The tools may also determine whether the instance-level memory pool contains a number of free buffers that exceeds a threshold.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to application-specific heap management are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for application-specific heap management. This discussion also describes other techniques and/or processes that the tools may perform.

Figure 1:
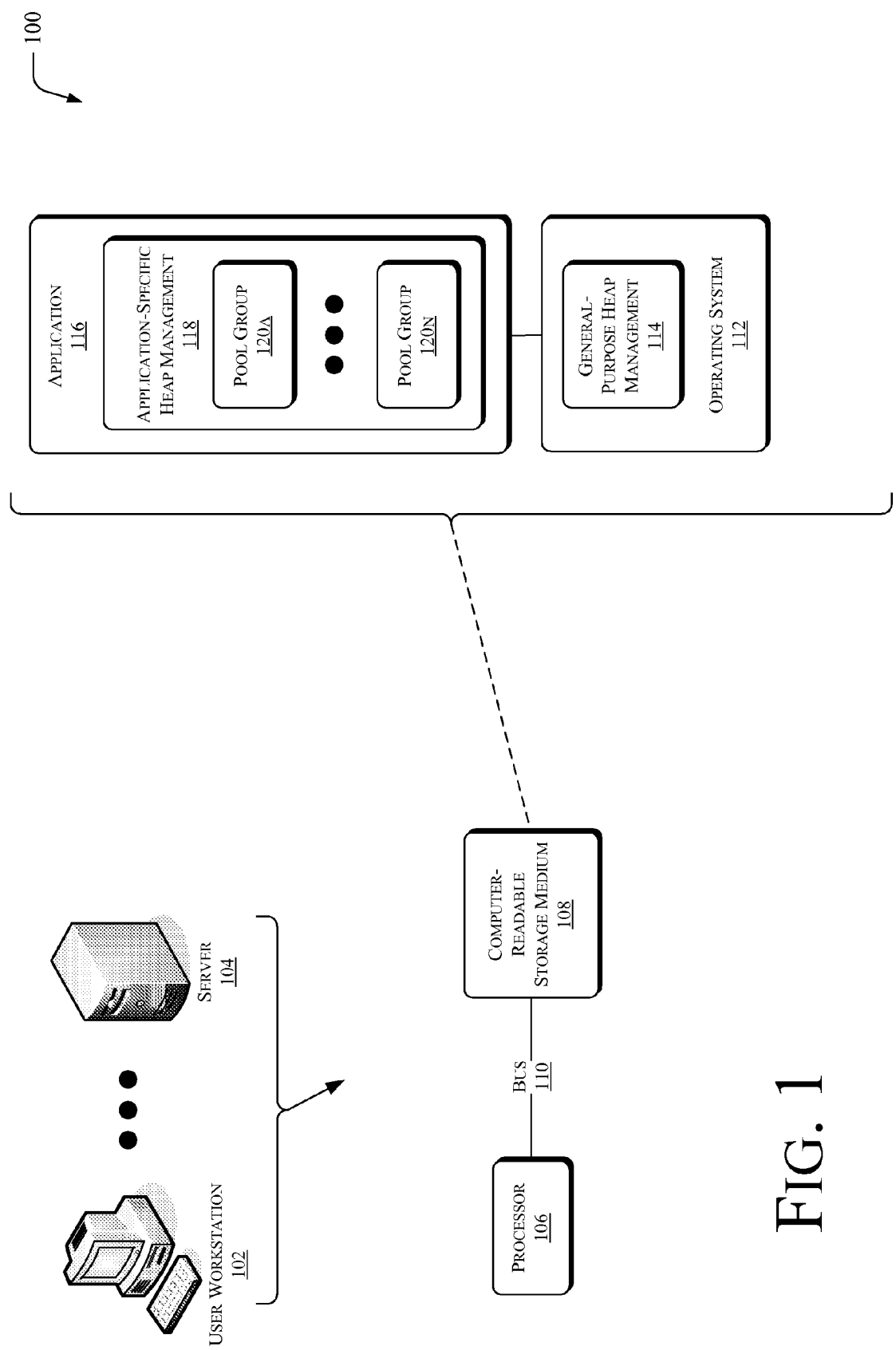
FIG. 1 is a block diagram illustrating systems and/or operating environments in which tools and techniques for application-specific heap management may perform.

FIG. 1 illustrates systems and/or operating environments 100 in which tools and techniques for application-specific heap management may perform. The systems 100 may include one or more user workstations 102 and/or servers 104. However, it is noted that this description provides these examples only to facilitate discussion of the subject matter herein, but not to limit possible implementations of this subject matter. Devices other than those shown in FIG. 1 may benefit from application-specific heap management, as described herein.

Turning to the workstations and servers in more detail, the workstations and/or servers may be computer-based systems that include one or more processors, denoted at 106. These processors may also be categorized or characterized as having a given type or architecture, but in implementations that include more than one processor, these processors may or may not have the same type or architecture.

The workstations and/or servers may also include one or more instances of machine-readable or computer-readable storage media, denoted generally at 108. The processor 106 may communicate with the computer-readable media 108, and other components or sub-systems of the workstations and/or servers, via one or more busses 110. These busses 110 may be of any suitable width, and may comply with any convenient bus architecture.

The computer-readable media 108 may contain instructions that, when executed by the processor 106, perform any of the tools or related functions that are described herein as being performed by the workstations and/or servers. The processor may access and/or execute the instructions embedded or encoded onto the computer-readable media, and/or may access data stored in the computer-readable media. Additionally, it is noted that the computer-readable storage media, and any software stored thereon, may reside on hardware other than that shown in FIG. 1 without departing from the scope and spirit of the description herein. The examples shown in FIG. 1 are provided only to facilitate discussion, but not to limit possible implementations.

Turning in more detail to the computer-readable media 108, it may include one or more modules of software instructions related to an operating system, as represented generally at 112. The operating system may include or provide a general-purpose heap management utility, denoted generally at 114. As known in the industry, the term "heap" refers to a large pool of free memory, portions of which may be allocated or deallocated dynamically upon request. In the example shown in FIG. 1, the heap management utility 114 may administer the heap on behalf of the operating system.

The computer-readable media 108 may include one or more application programs, denoted generally at 116. This application may interact with one or more application-specific heap management modules, denoted generally at 118. As described further below, the heap management module 118 may profile or analyze the application 116, and manage heap requests specifically for the application.

To administer or manage these heap requests, the heap management module 118 may define one or more pool group constructs, with FIG. 1 providing examples of pool groups at 120a and 120n (collectively, pool groups 120). As detail further below, these groups 120 may include collections of buffers that are organized into pools so as to enable the tools to manage heap requests for the application 120.

Figure 2:
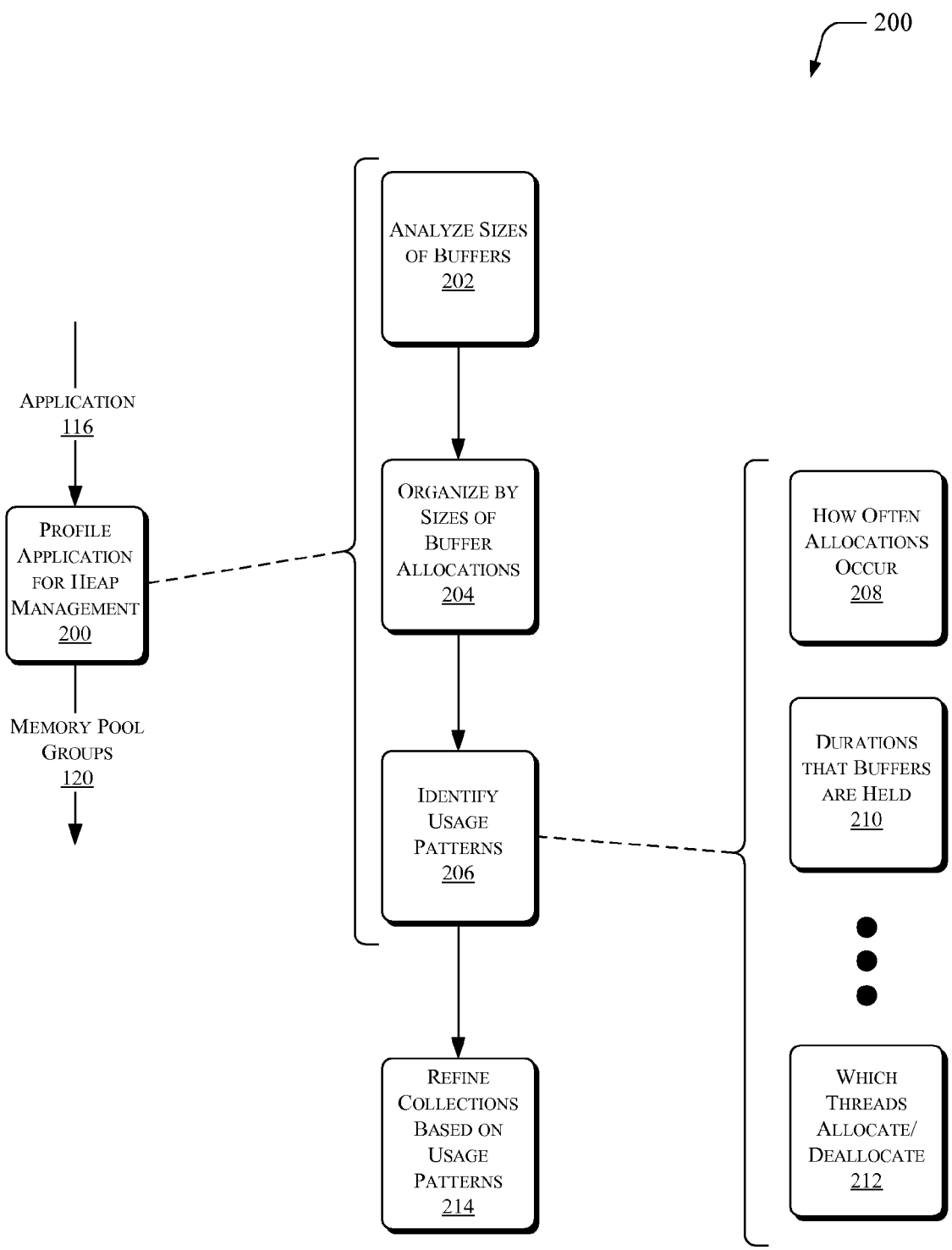
FIG. 2 is a flow diagram of processes for analyzing or profiling an application to define memory pool groups suitable for performing application-specific heap management.

Having described the systems and/or operating environments 100 for performing application-specific heap management in FIG. 1, the discussion now turns to a description of how the tools for performing application-specific heap management may analyze the application to define the pool groups, now presented with FIG. 2.

FIG. 2 illustrates process flows 200 for analyzing or profiling an application (e.g., 116) to define memory pool groups (e.g., 120) suitable for performing application-specific heap management. These process flows 200 may pre-process or profile the application, to enable the tools to perform application-specific heap management. For convenience of description, but not to limit possible implementations, FIG. 2 may carry forward some items described previously, and may denote them by similar reference signs.

As shown in FIG. 2, the processes 200 may include analyzing the application, and identifying the sizes of any buffers allocated by the application, as represented at block 202. The processes 200 may also include organizing or grouping the buffers by their sizes, as indicated at block 204. For example, a first collection of buffers may include buffers whose sizes fall within a first range, a second collection of buffers may include buffers whose sizes fall within a second range, and so on.

Block 206 represents analyzing how the application uses buffers. Put differently, block 206 may include determining what patterns of usage the application, and/or threads thereof, would exhibit during execution. For example, block 208 represents determining how fast or how often applications and/or threads allocate or deallocate buffers. Block 210 represents determining how long different buffers are held after allocation, before they are deallocated.

Block 212 represents determining which threads allocate particular buffers, and which threads de-allocate particular buffers. For example, in some cases, one thread may allocate a particular buffer, while another thread deallocates that buffer. In other cases, the same thread may allocate and de-allocate the buffer.

FIG. 2 provides the examples of usage patterns represented in blocks 208-212 only to facilitate understanding of the present discussion, but not to limit possible implementations of the description herein. Other examples of usage patterns are possible without departing from the scope and spirit of the description herein.

Block 214 represents refining the collections based on the usage patterns identified in block 206, or more particularly blocks 208-212. For example, block 204 may preliminarily organize the buffers by sizes, and block 214 may move particular buffers from one collection to another based on identified usage characteristics.

Figure 3:
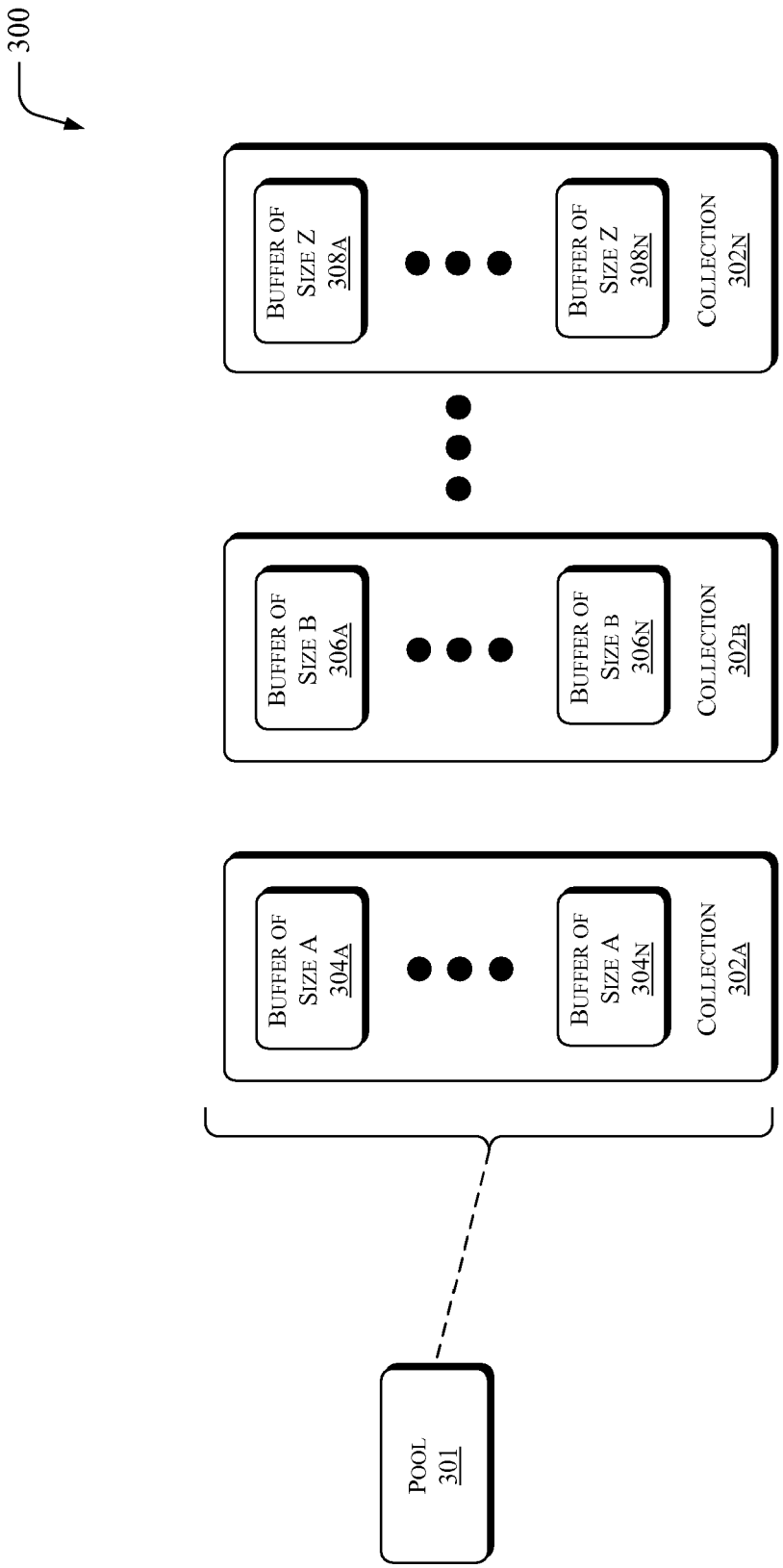
FIG. 3 is a block diagram illustrating a memory pool group and buffers included within the pool group.

Having described the processes 200 for analyzing or profiling the application, the discussion now turns to a more detailed description of pools and buffers, now presented with FIG. 3.

FIG. 3 illustrates a memory pool (e.g., 120) and buffers included within the pool. The pool and related buffers are denoted generally at 300, with the pool denoted at 301. For convenience of description, but not to limit possible implementations, FIG. 3 may carry forward some items described previously, and may denote them by similar reference signs.

The processes 200 shown in FIG. 2 may result in the memory pool structure shown in FIG. 3. More specifically, the memory pool 301 may include one or more collections of buffers, with FIG. 3 providing examples of such collections at 302a, 302b, and 302n (collectively, collections 302). These collections may be organized by buffer size and usage pattern, based on the analysis performed in FIG. 2.

In some cases, the collection 302a may include an arbitrary number of buffers 304a-304n having a given size or range of sizes A. Likewise, the collection 302b may include an arbitrary number of buffers 306a-306n having a second given size or range of sizes B, and the collection 302n may include an arbitrary number of buffers 308a-308n having another given size or range of sizes Z.

In other cases, the arrangement shown in FIG. 3 may be refined at least somewhat based on usage patterns related to different buffers. For example, one or more buffers may initially be assigned to the collection 302a, but may move to the collection 302b. These moved buffers may share common usage patterns with those buffers in the collection 302b, and therefore these moved buffers may be managed together.

By profiling and organizing the buffers allocated in the applications and/or threads, the tools described herein may manage the heap to minimize or reduce heap fragmentation. For example, by organizing buffers of approximately equal size into common pools or collections, the tools may allocate and deallocate (or free) them more efficiently, lessening the amount of fragmentation suffered by the heap as the applications and/or threads execute.

Figure 4:
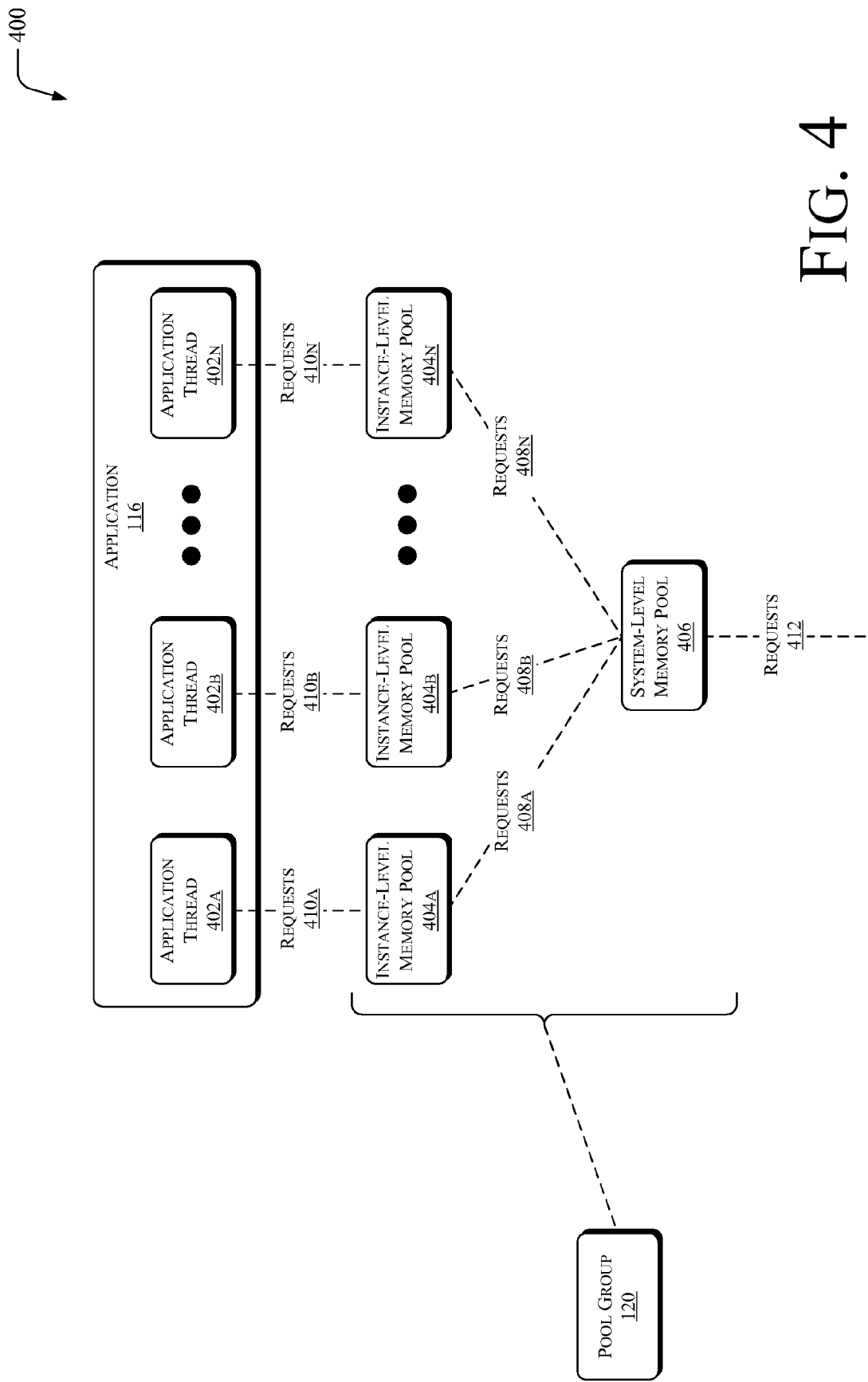
FIG. 4 is a block diagram illustrating a hierarchy for arranging memory resources.

Having described the memory pool and buffers in FIG. 3, the discussion now proceeds to a description of a hierarchy for arranging memory resources, now presented in FIG. 4.

FIG. 4 illustrates a hierarchy for arranging memory resources, denoted generally at 400. For convenience of description, but not to limit possible implementations, FIG. 4 may carry forward some items described previously, and may denote them by similar reference signs.

FIG. 4 carries forward the application 116, and the application may include any number of executing threads, with FIG. 4 providing three examples of such threads at 402a, 402b, and 402n (collectively, threads 402). Additionally, FIG. 4 carries forward the pool group 120 from FIG. 1. The pool group 120 may include one or more instance-level memory pools, with FIG. 4 providing three examples at 404a, 404b, and 404n (collectively, instance-level memory pools 404). However, the example shown in FIG. 4 is non-limiting, and generally, implementations of the pool groups may include an instance-level memory pool that corresponds to an application thread. Therefore, the number of instance-level memory pools in the pool 120 at any given time may depend on how many threads the application contains at that time. Additionally, any given application 116 may have access to one or more pool groups 120, and the example shown in FIG. 4 is provided only to present a concise illustration.

The memory pool group 120 may also contain a system-level memory pool 406, which provides a collection of memory to which the instance-level memory pools 404 may allocate and de-allocate. FIG. 4 denotes requests flowing between the pools 404 and 406 by the dashed lines 408a, 408b, and 408n (collectively, requests 408).

In turn, the instance-level memory pools 404 may allocate and de-allocate memory from the system-level memory pool, in response to requests from the application threads 402. FIG. 4 symbolizes these requests by the dashed lines 410*a*, 410*b*, and 410*n* (collectively, requests 410).

As described further below in FIGS. 5 and 6, the system-level memory pool may interact with a general-purpose heap management module (e.g., 114) to allocate and deallocate memory from a system heap. FIG. 4 represents these allocations and deallocations generally at the line 412.

Figure 5:
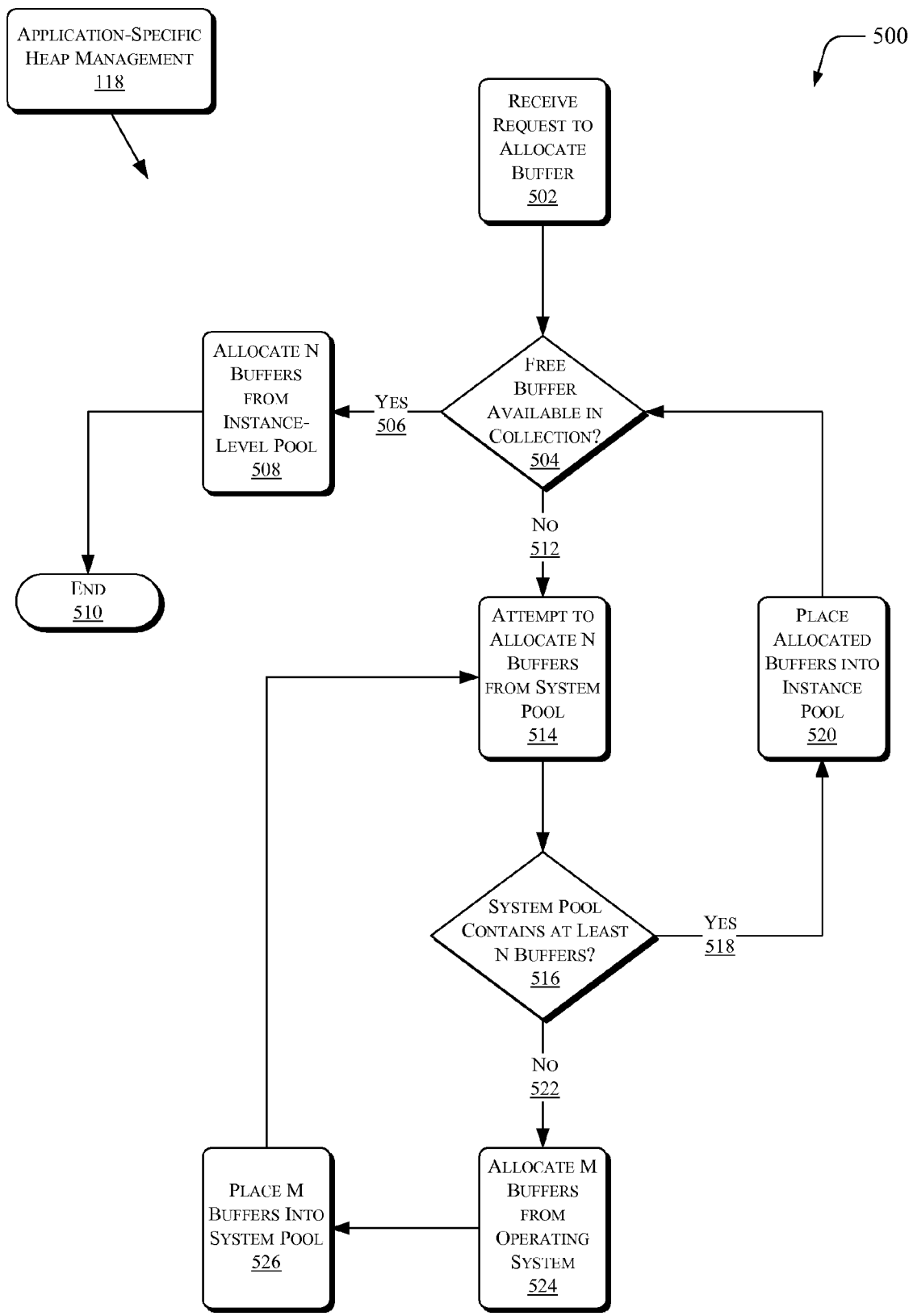
FIG. 5 is a flow diagram of processes for allocating buffers while providing for application-specific heap management.

Having described the hierarchy for arranging memory resources in FIG. 4, the discussion now turns to a description of process flows for allocating buffers while providing for application-specific heap management, now presented with FIG. 5.

FIG. 5 illustrates process flows 500 for allocating buffers while providing for application-specific heap management. For convenience of description, but not to limit possible implementations, FIG. 5 may carry forward some items described previously, and may denote them by similar reference signs.

Block 502 represents receiving a request to allocate one or more buffers. For example, block 502 may include receiving such a request from an application (e.g., 116), or a thread thereof (e.g., 202). This request may specify a size of buffer to be allocated. FIG. 4 shows examples of such requests at 410.

Collections of buffers (e.g., 302 in FIG. 3 or 404 in FIG. 4) may be allocated to support requests from particular entities, for example, the entity (e.g., an application or thread) that submitted the request that was received in block 502. Block 504 represents evaluating whether a buffer of the requested size is available within that collection of buffers. For example, if a thread made the request in block 502, the block 504 may include determining whether an instance-level memory pool (e.g., 404) for that thread contains enough free space to allocate a buffer that satisfies the incoming request.

If the output of block 504 is positive, that is, if the instance-level memory pool contains enough free space to satisfy the request, then the process flows 500 may take Yes branch 506 to block 508, which represents allocating the requested buffer from the free space available in the instance-level memory pool. Afterwards, the processes 500 may proceed to an end state 510 to await a next request for a buffer, at which point the processes 500 may return to block 502.

Returning to the evaluation block 504, if the instance-level memory pool does not contain enough free space to satisfy the request, then the processes 500 may take No branch 512 to block 514. At block 514, the processes 500 attempt to allocate N buffers from a system-level pool of memory shared across one or more entities that may request buffers (e.g., applications, threads, or the like). FIG. 4 provides an example of such a system-level memory pool at 406.

The parameter N referenced herein may take any suitable positive integer value, and may be selected as appropriate for different implementations. Generally, this N value indicates how many buffers are to be allocated from the system-level memory pool and made available to satisfy requests from the instance-level pools. For example, once block 504 indicates that a given instance-level pool has no more free memory, then block 514 may attempt to allocate additional memory from the system-level memory pool. This additional memory may include not only enough memory to satisfy the incoming request, but also enough memory to satisfy future requests.

In this manner, the instance-level memory pools may pre-allocate memory to avoid the overhead of additional allocation requests later on, at the cost of depriving other threads of access to this memory. Thus, implementations of the description herein may set the parameter N to reflect a trade-off between avoiding request overhead and memory usage, among other factors. If N is increased, then the processes 500 may reduce request overhead, while consuming available memory more quickly. If N is decreased, then the processes 500 may increase request overhead, while consuming available memory less quickly.

Block 516 represents determining whether the system-level memory pool contains at least N buffers that are available for allocation. If the output of block 516 is positive, then the processes 500 may take Yes branch 518 to block 520, which represents placing the allocated buffers into the instance-level pool that services the requesting entity. Afterwards, the processes may return to block 504 to determine if the buffers newly-allocated to the instance-level pool satisfies the request received in block 502.

Returning to block 516, if the system-level pool does not contain enough space to allocate N buffers, then the processes 500 may take No branch 522 to block 524, which represents allocating M buffers from an operating system level heap. Block 526 represents placing the M allocated buffers into the system-level pool (e.g., 406). FIG. 1 provides an example of a general-purpose heap management module at 114, and provides an example of an operating system (OS) at 112.

The parameter M indicates how many buffers to allocate from the OS-level heap. The same factors considered when setting the value of the parameter N, as discussed above, may apply equally to setting the parameter M.

From block 526, the processes 500 may return to block 514 to evaluate whether the M newly-allocated buffers are sufficient to enable block 514 to allocate the N new buffers. From block 514, the processes 500 may repeat the following blocks as described above.

Figure 6:
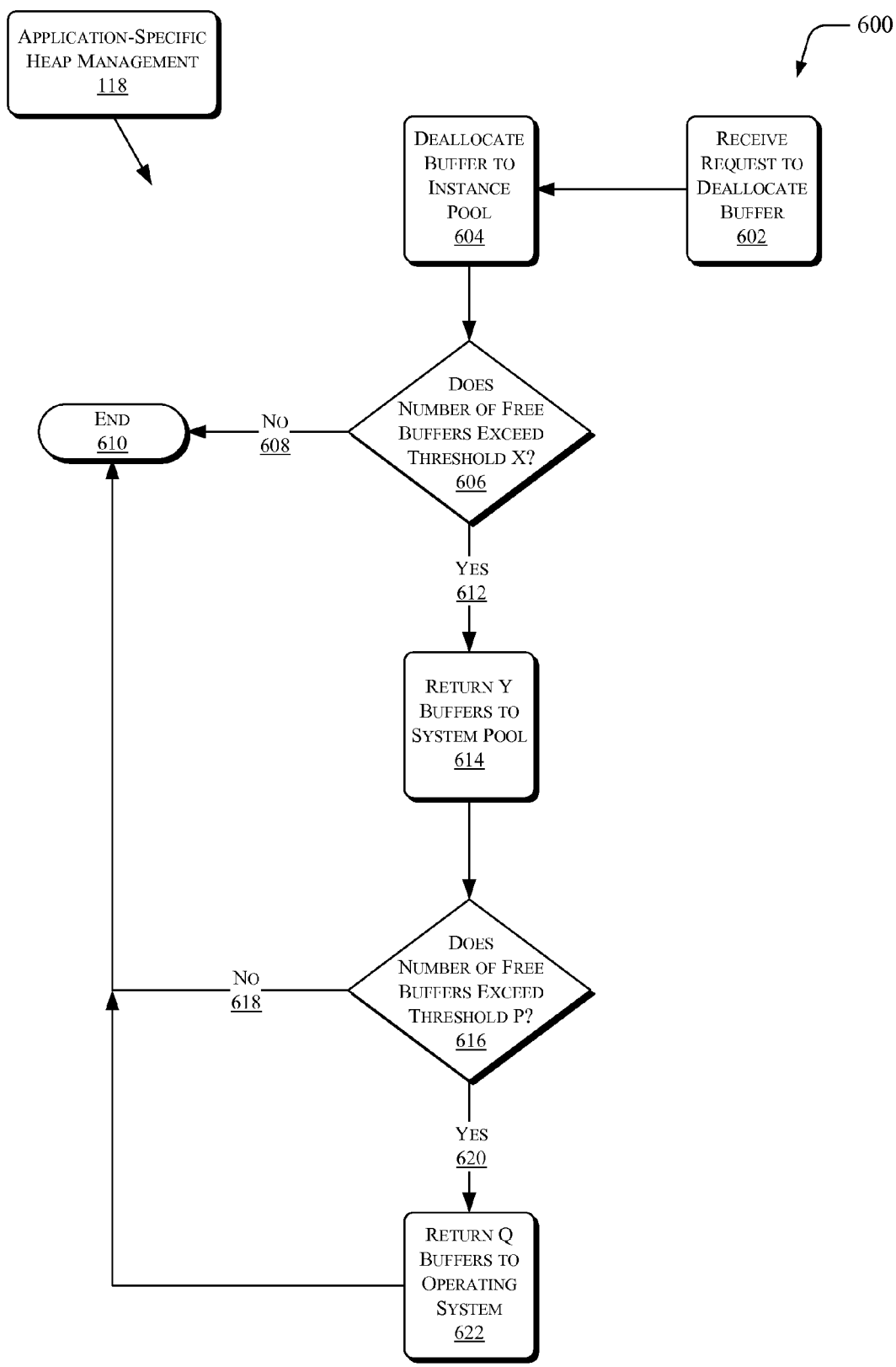
FIG. 6 is a flow diagram of processes for deallocating buffers while providing for application-specific heap management.

Having described the processes 500 for allocating buffers while providing for application-specific heap management, the discussion now turns to a description of processes for deallocating buffers while providing for application-specific heap management, now presented with FIG. 6.

FIG. 6 illustrates process flows 600 for deallocating buffers while providing for application-specific heap management. For convenience of description, but not to limit possible implementations, FIG. 6 may carry forward some items described previously, and may denote them by similar reference signs.

Block 602 represents receiving a request to deallocate one or more previously allocated buffers. Block 602 may include receiving a deallocation request from, for example, an application or a thread thereof.

Block 604 represents deallocating the requested buffers to a given instance-level memory pool (e.g., 404 in FIG. 4). These deallocated buffers would then be available for reallocation later.

Block 606 represents determine whether the number of free buffers in the given instance-level memory pool exceeds a pre-defined parameter or threshold, denoted at X in FIG. 6. This parameter X may be a positive integer indicating how many free buffers may exist in the instance-level memory pool before the instance-level memory pool releases at least some of the buffers to the system-level memory pool (e.g., 406 in FIG. 4). The value chosen for the parameter X may reflect a trade-off between having enough memory allocated in the instance-level memory pool to satisfy incoming requests from applications or threads, versus allocating excessive numbers of buffers to any one instance-level memory pool.

From block 606, if the number of free buffers in the instance-level memory pool does not exceed X, then the processes 600 may take No branch 608 to an end state 610. Form the end state 610, the processes 600 may await a next request to deallocate, at which point the processes 600 may return to block 602.

Returning to block 606, if the number of free buffers in the instance-level memory pool does exceed X, then the processes 600 may take Yes branch 612 to block 614, which represents returning Y free buffers to the system-level memory pool. The parameter Y indicates how many of the free buffers to transfer from a given instance-level memory pool to the system-level memory pool.

Block 616 represents evaluating whether the number of free buffers in the system-level memory pool exceeds a pre-defined parameter or threshold P. The value chosen for the parameter P may reflect a trade-off between having enough memory allocated in the system-level memory pool to satisfy incoming requests to allocate buffers to instance-level memory pools, versus allocating excessive numbers of buffers to the system-level memory pool.

From block 616, if the number of free buffers in the system-level memory pool does not exceed P, then the processes 600 may take No branch 618 to the end state 610. Otherwise, from block 616, if the number of free buffers in the system-level memory pool does exceed P, then the processes 600 may take Yes branch 620 to block 622, which represents returning Q buffers to an OS-level heap. The parameter Q indicates how many of the free buffers to transfer from a given system-level memory pool to the OS-level memory pool or heap.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. At least one machine-readable storage medium comprising machine-readable instructions that, when executed by the machine, cause the machine to perform a method comprising:
separately profiling threads of an application to facilitate management of heap memory associated with the application; and
managing at least one request from the application to allocate or deallocate from the heap memory based on the profiling, wherein the instructions for profiling the application include instructions for:
identifying at least one buffer usage pattern exhibited by the application, the identifying at least one buffer usage pattern including instructions for determining which one of the threads of the application allocates or deallocates a buffer, when the application allocates the buffer, how long the buffer remains allocated by the application, and how fast the application allocates or deallocates the buffer; and
moving the buffer from a first group of buffers to a second group of buffers based on the identified buffer usage pattern.

2. The machine-readable storage medium of claim 1, wherein the instructions for profiling the application include instructions for analyzing a size of at least one buffer defined in the application.

3. The machine-readable storage medium of claim 1, wherein the instructions for profiling the application include instructions for grouping a plurality of buffers defined by the application based on sizes of the buffers.

4. At least one machine-readable storage medium comprising machine-readable instructions that, when executed by the machine, cause the machine to perform a method comprising:
receiving from a thread of an application at least one request to allocate at least one buffer to the thread exclusive of other threads in the application; and
determining whether an instance-level memory pool that corresponds one-to-one to the thread of the application contains free buffers sufficient to satisfy the request;
when the instance-level memory pool contains free buffers sufficient to satisfy the request, allocating the buffer from the instance-level memory pool in response to the request;
when the instance-level memory pool does not contain free buffers sufficient to satisfy the request, determining whether a system-level memory pool associated with the instance-level memory pool contains free buffers sufficient to satisfy the request;
when the system-level memory pool contains free buffers sufficient to satisfy the request, allocating at least one buffer from the system-level memory pool to the instance-level memory pool, in response to determining that the system-level memory pool contains free buffers sufficient to satisfy the request; wherein the system-level memory pool corresponds exclusively to the application and the system-level memory pool is shared across instance-level memory pools associated with threads of the application;
when the system-level memory pool does not contain free buffers sufficient to satisfy the request, allocating at least one buffer from an operating system level memory pool to the system-level memory pool in response to determining that the system-level memory pool does not contain free buffers sufficient to satisfy the request.

5. The machine-readable storage medium of claim 4, wherein a number of instance-level memory pools in a pool group exclusively for the application depends on a number of threads the application contains, the pool group comprising one instance-level memory pool for each executing thread in the application and one system-level memory pool from which each instance-level memory pool requests allocation of buffers.

6. At least one machine-readable storage medium comprising machine-readable instructions that, when executed by the machine, cause the machine to perform a method comprising:
receiving from a thread of an application at least one request to deallocate at least one buffer;
in response to the request, deallocating the buffer into an instance-level memory pool associated exclusively with the thread of the application;
determining whether the instance-level memory pool contains a number of free buffers that exceeds a first threshold;
when the instance-level memory pool contains a number of free buffers that exceeds the first threshold, deallocating at least one buffer from the instance-level memory pool to a system-level memory pool, wherein the system-level memory pool corresponds exclusively to the application and the system-level memory pool is shared across instance-level memory pools associated with threads of the application;

determining whether the system-level memory pool contains a number of free buffers that exceeds a second threshold; and when the system-level memory pool contains a number of free buffers that exceeds the second threshold, deallocating at least one buffer from the system-level memory pool to an operating system level memory pool shared across one or more system-level memory pools.

7. At least one machine-readable storage medium comprising machine-readable instructions that, when executed by the machine, cause the machine to perform a method comprising:

profiling at least a portion of an application to facilitate management of a hierarchical memory pool group, the profiling comprising:

identifying at least one buffer usage pattern exhibited by the application by determining which thread of the application allocates or deallocates at least one buffer from an instance-level memory pool associated exclusively with the thread, wherein a number of instance-level memory pools in the hierarchical memory pool group corresponds one-to-one to the threads contained by the application;

allocating at least one buffer to the thread of the application, the allocating comprising:

receiving from the thread of the application at least one request to allocate at least one buffer;

determining whether the instance-level memory pool that corresponds one-to-one to the thread of the application contains free buffers sufficient to satisfy the request;

when the instance-level memory pool contains free buffers sufficient to satisfy the request, allocating a buffer to the thread; and when the instance-level memory pool does not contain free buffers sufficient to satisfy the request, determining whether a system-level memory pool associated exclusively with the application and shared across the threads of the application contains free buffers sufficient to satisfy the request; and deallocating at least one buffer from the thread of the application, the deallocating comprising:

receiving from the thread of the application at least one request to deallocate at least one buffer;

in response to the request, deallocating the buffer into the instance-level memory pool associated with the thread of the application;

determining whether the instance-level memory pool contains a number of free buffers that exceeds a threshold; and when the instance-level memory pool contains a number of free buffers that exceeds a threshold, deallocating at least one buffer from the instance-level memory pool to the system-level memory pool.

8. The machine-readable storage medium of claim 7, further comprising:

instructions for determining whether an operating system level memory pool shared across one or more system-level memory pools contains free buffers sufficient to satisfy the request in response to determining that the system-level memory pool does not contain free buffers sufficient to satisfy the request; and instructions for deallocating at least one buffer from the system-level memory pool to the operating system level memory pool in response to determining that the system-level memory pool contains a number of free buffers that exceeds a further threshold.

* * * * *